J. L. EARL.
PISTON RING CLAMP.
APPLICATION FILED MAY 24, 1915.

1,169,627.

Patented Jan. 25, 1916.

Witnesses
Edwin J. Beller
R. J. McWhinney

Inventor
John L. Earl,
by Wilkinson, Guida & Mackay
Attorneys

UNITED STATES PATENT OFFICE.

JOHN LOUIS EARL, OF MORGAN CITY, LOUISIANA.

PISTON-RING CLAMP.

1,169,627.

Specification of Letters Patent.

Patented Jan. 25, 1916.

Application filed May 24, 1915. Serial No. 30,188.

*To all whom it may concern:*

Be it known that I, JOHN LOUIS EARL, a citizen of the United States, residing at Morgan City, in the parish of St. Mary and State of Louisiana, have invented certain new and useful Improvements in Piston-Ring Clamps; and I do hereby declare the following to be a full, clear, and exact description of the invention, such as will enable others skilled in the art to which it appertains to make and use the same.

The present invention relates to improvements in piston ring clamps, and has for an object to provide an improved clamp for maintaining the packing rings on engine pistons, pump plungers, and the like, in contracted position within their respective recesses during the operation of assembling the cylinders over the same to prevent injury to the packing rings and scratching of the interior wall of the cylinders.

Another object of the present invention resides in providing an improved piston ring clamp of the above character, which, in addition to performing the before-mentioned functions, also acts to center the cylinders and to properly guide the same over the respective pistons.

It is a further object of the present invention to provide an improved piston ring clamp which will be simple in construction, constituted of a minimum of parts, and adapted for ready operation to effect the assembly with economy of labor and time.

With these and other objects in view the invention consists in the novel details of construction and combinations of parts more fully hereinafter disclosed and particularly pointed out in the claim.

Figure 1:
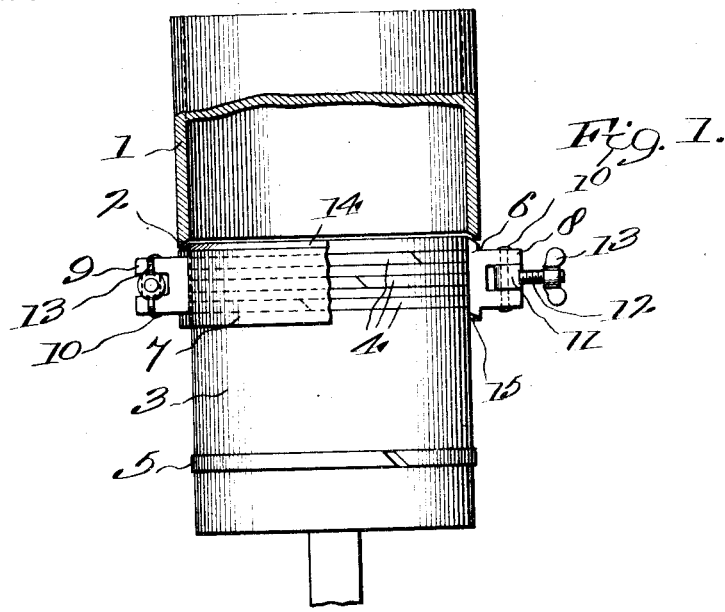
Figure 2:
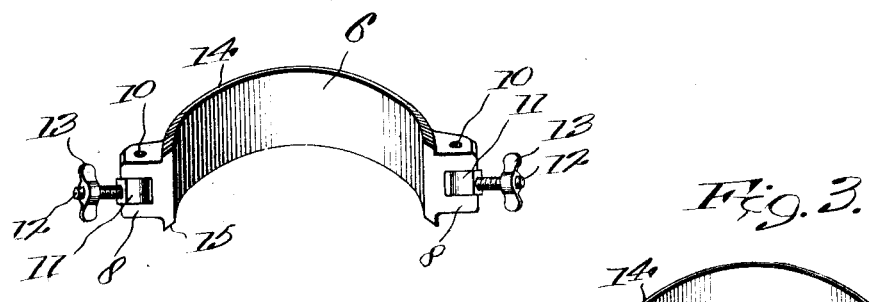
Figure 3:
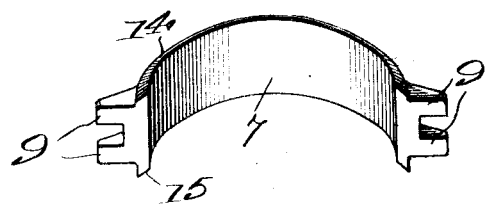

In the accompanying drawings forming a part of this invention, and in which similar reference symbols indicate corresponding parts in the several views: Figure 1 is a side elevational view, partly in section, of a cylinder and piston illustrating an improved piston ring clamp, constructed in accordance with the present invention and shown partly broken away. Fig. 2 is a perspective view of one section of the improved clamp; and Fig. 3 is a perspective view of the complementary section of the clamp.

Referring more particularly to the drawings, wherein one embodiment of the present invention is illustrated, 1 designates an engine, pump, or other cylinder, constructed in accordance with any approved design, and formed with a counterbore 2 at its lower edge.

The piston or flange 3 is constructed with the usual recesses to receive the packing rings 4, located at the upper portion thereof, and the oil ring 5, shown in Fig. 1 unconfined and in expanded condition.

The improved ring clamp is, in accordance with the present invention, preferably constituted of a pair of half sections 6 and 7 assembled together to provide a continuous annular collar adapted to embrace the piston 3, and maintain the rings 4 in contracted position within their respective recesses.

The collar sections 6 and 7 are formed at their adjacent ends with pairs of ears 8 and 9, respectively, the ears 8 being perforated to receive pins 10, upon which are hingedly mounted blocks 11. To each of the blocks 11 is connected a bolt 12, threaded to receive a wing nut 13, the same being adapted to coöperate with the complemental ears 9 on the opposite collar section 7 for maintaining the parts assembled, as indicated in Fig. 1.

The assembled collar, as shown in Fig. 1 is beveled along its upper edge, as at 14, to coöperate with the counterbore 2 in the cylinder 1, into which latter the collar is received and acts to form a guide for the cylinder during the operation of assembling. The assembled collar is similarly provided with an outwardly directed bevel 15, along its lower edge, for encountering the oil ring 5 when the collar is forced downwardly, and moving the oil ring 5 to contracted position within its recess without working injury upon the same.

In operation, the sections 6 and 7 are fitted together with the ears 8 and 9 in registry, and the hinged bolts 12 are thereupon turned about the pins 10 to move the blocks 11 within the ears 9, where the same are arranged to be snugly received, the wing nuts 13 being tightened to secure the parts in position. It will be understood, from an inspection of Fig. 1 that the clamp will be of sufficient depth to embrace the series of packing rings 4, and when sufficiently tightened thereabout will operate to force the rings within their recesses in contracted position and flush with the interior wall of the cylinder 1.

The initial position of the improved clamp is substantially that shown in Fig. 1; in which position the parts are in readiness to receive the cylinder 1, which is thereupon fitted with its counterbore 2 engaging the beveled upper edge of the clamp, the clamp thereby forming with the cylinder wall one continuous and unbroken surface for the passage of the packing rings 4. Following the usual manner, the cylinder 1 will now be forced downwardly over the piston 3, the same carrying therewith the clamp device, which will slide freely thereover.

During its downward movement, the lower beveled edge 15 of the clamp device will encounter the oil ring 5 on the piston 3, gradually forcing the same inward without injury thereto until the same is moved to its finally contracted position. The oil ring 5 will thus be held in contracted position until the same has been received into the cylinder 1. After the operation of assembling has been completed, the wing nuts 13 will be revolved, and the sections 6 and 7 disengaged and removed for replacement to assemble successive pistons.

It is obvious that those skilled in the art may vary the details of construction and arrangements of parts without departing from the spirit of my invention, and therefore I do not wish to be limited to such features except as may be required by the claim.

I claim:

In a device of the character described, the combination of an annular collar comprising a pair of complementary half sections fitted together to form the same adapted to embrace the piston and confine the piston rings in contracted position, said assembled collar being provided with an outwardly beveled upper end adapted to fit within the cylinder counterbore and the inner surface of said collar adapted to form a continuous and unbroken surface with the cylinder bore, the lower edge of said assembled collar being beveled inwardly to encounter the oil ring when the cylinder is moved downwardly and contract the same; pairs of spaced ears projecting radially from the free ends of said half sections and being fitted in close contact with the adjacent ears, blocks pivoted in certain of said ears and arranged to swing within the complemental ears of the opposite half section and be snugly received therein, threaded bolts on said blocks, and nuts on said bolts for engaging the opposite sides of the corresponding ears to bind the sections together, substantially as described.

In testimony whereof, I affix my signature.

JOHN LOUIS EARL.